L. PERONI,
Assignor to J. J. HICKS.
THERMOMETER.
No. 10,189. Reissued Aug. 29, 1882.
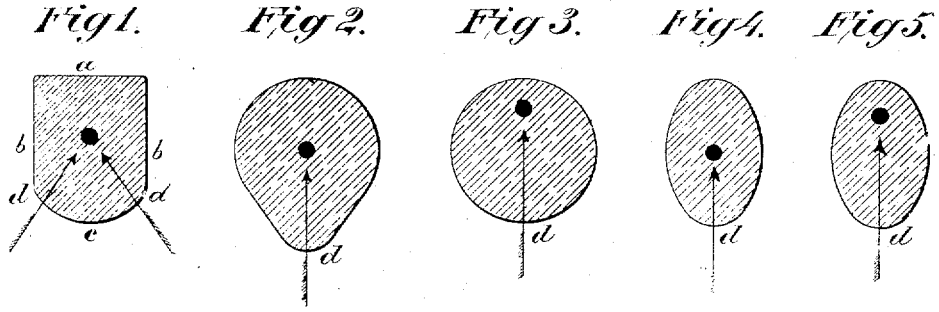
Witnesses:
Geo. T. Smallwood Jr.
L. M. Hopkins.
Inventor:
Luigi Peroni.
By Knight Bros.
Atty.

UNITED STATES PATENT OFFICE.

LUIGI PERONI, OF 45 HATTON GARDEN, HOLBORN, ASSIGNOR TO JAMES JOSEPH HICKS, OF 8 HATTON GARDEN, COUNTY OF MIDDLESEX, ENGLAND.

THERMOMETER.

SPECIFICATION forming part of Reissued Letters Patent No. 10,189, dated August 30, 1882.

Original No. 222,420, dated December 9, 1879. Application for reissue filed January 24, 1882. Patented in England January 24, 1878.

*To all whom it may concern:*

Be it known that I, LUIGI PERONI, of 45 Hatton Garden, Holborn, in the county of Middlesex, England, glass-blower, have invented new and useful Improvements in Thermometers, which improvements are fully set forth in the following specification, reference being had to the accompanying drawings.

My invention has for its object improvements in the construction of glass tubes employed in the manufacture of thermometers, whereby thermometers made of such tubes possess the advantage of magnifying the bore of the tube more than is the case with tubes of the forms heretofore employed, thereby giving increased facility for reading the indications of the mercury or fluid therein, the importance of which will be best illustrated by reference to the use of the clinical as well as to the chemical thermometer having a very fine bore.

My improvements are effected as follows: Instead of making the tube circular and with the bore in the center thereof, as is usual, the bore is located in rear of or beyond the mechanical axis or center of the convexity of that part of the surface through which it is viewed, so that such convex surface, being eccentric to the bore, will act as a lense in magnifying the bore. This is effected either by locating the bore in rear of the center of the tube or by forming the front of the tube with one or more convexities of less radius than the tube, or by both these means combined, the surface through which the bore is viewed being in either case eccentric to the bore, and thereby adapted to act as a magnifying-lens. According to one form, as represented to an enlarged scale at Fig. 1, the tube is made with a section consisting of a flat back, *a*, two parallel sides, *b*, and a circular or convex front, *c*; and in producing tubes of such section by drawing the circular or convex front *c* becomes connected with the sides *b* by small convexities *d*, which, by reason of the bore being beyond the mechanical center or axis of such convexities *d*, act as magnifying curves or lenses, and thus magnify the appearance of the bore more than is the case with thermometer-tubes made, as heretofore, with the bore placed in the mechanical center or axis of the tube or of that portion or surface of the tube through which it is viewed. The tube is preferably made with the enameled ground or back at present in use.

The bore is seen enlarged or magnified by a view thereof through the magnifying-convexities *d* of the tube in the direction of the arrows.

By forming the tube with flat back *a* and parallel sides *b* the rolling of thermometers made therefrom is prevented, and consequently the liability to breakage of the thermometer from such rolling is prevented or considerably lessened.

At Fig. 2 I have represented on an enlarged scale a section of different-shaped tubing with my invention applied thereto. In this case the tube is mainly circular in section, and the bore is in the center of the main portion thereof; but the tube is formed with a convex portion, *d*, standing out beyond the general surface of the tube, and by reason of the bore of the tube being beyond the mechanical axis or center of such raised convex portion *d* the latter acts as a lens or magnifying-curve and greatly magnifies the appearance of the bore.

At Fig. 3 I have represented another section of tubing, in which the tube is circular in section; but in consequence of the bore thereof being placed in rear of the center the bore is enlarged in appearance.

At Fig. 4 I have represented a section of another tube, consisting of an oval or ellipse. In this case the bore may be placed in the center of the longitudinal axis of the oval or ellipse, as shown, or it may be placed at rear of such center, as shown at Fig. 5. The bore in this case is seen greatly enlarged or magnified by a view thereof through the longitudinal axis of the oval or ellipse.

It will be evident that my invention may be applied to other sections of tubes than those above referred to.

Having thus described the nature of my said invention and the mode in which I carry the same into effect, I would have it understood that what I claim is—

1. A thermometer having its bore in rear of or beyond the mechanical axis or center of the convex surface through which it is viewed, as and for the purpose described.

2. A thermometer having a convex or lens front for magnifying the bore formed of a smaller curve than that of the body of the thermometer, substantially as set forth.

3. A thermometer-tube having its bore in rear of or beyond the center thereof, and a convex portion or portions, *d*, for magnifying said bore, substantially as set forth.

LUIGI PERONI.

Witnesses:
C. M. WHITE,
ALFRED H. JONES.